United States Patent [19]
Natarajan

[11] Patent Number: 5,826,169
[45] Date of Patent: Oct. 20, 1998

[54] ADMISSION CONTROL SYSTEM AND METHOD IN SPACE-BASED MOBILE TELECOMMUNICATION SYSTEM

[75] Inventor: Kadathur S. Natarajan, Schaumburg, Ill.

[73] Assignee: Motorola, Inc., Schaumburg, Ill.

[21] Appl. No.: 533,125

[22] Filed: Sep. 25, 1995

[51] Int. Cl.$^6$ .................................................. H04B 7/185
[52] U.S. Cl. ........................ 455/13.1; 455/428; 370/316
[58] Field of Search .................................. 455/12.1, 13.1, 455/34.1, 54.1, 54.2, 56.1, 450, 452, 507, 517, 518, 524, 67.1, 422, 427, 428; 379/58, 59; 370/316

[56] References Cited

U.S. PATENT DOCUMENTS 5,608,721  3/1997  Natarajan et al. ...................... 455/13.1

FOREIGN PATENT DOCUMENTS

536921A1  4/1993  European Pat. Off. ............... 455/13.1

*Primary Examiner*—Reinhard J. Eisenzopf
*Assistant Examiner*—Thanh Le
*Attorney, Agent, or Firm*—Harold C. McGurk

[57] ABSTRACT

The call admission control method provides guaranteed bandwidth connections in a mobile telecommunication networks (10) that have varying topology and dynamic capacities. Method (100) provides a systematic way to decide when to admit connection requests in a low-earth or medium-earth orbit based satellite telecommunication system (10). A call admission controller, located in a ground control station (40) receives a connection request from an earth station (50) that may be forwarded from a satellite (21) in a constellation (20) of satellites. The call admission controller segments a call holding time into a sequence of time segments and determines whether a path exists through the network (10) that has the required minimum bandwidth for each of the time segments. If such a path exists, the connection request is admitted and the call goes through. Otherwise, the call is denied and communication is blocked.

13 Claims, 2 Drawing Sheets

| NODE I | NODE J | C(I,J,t) | A(I,J,t) | C(J,I,t) | A(J,I,t) |
|---|---|---|---|---|---|
| 21 | 22 | 1000 | 300 | 1000 | 600 |
| 21 | 50 | 800 | 200 | 800 | 500 |
| 21 | 24 | 1200 | 900 | 1200 | 400 |
| 22 | 23 | 600 | 300 | 600 | 400 |
| 23 | 51 | 800 | 500 | 800 | 400 |
| 24 | 25 | 1400 | 900 | 1400 | 900 |

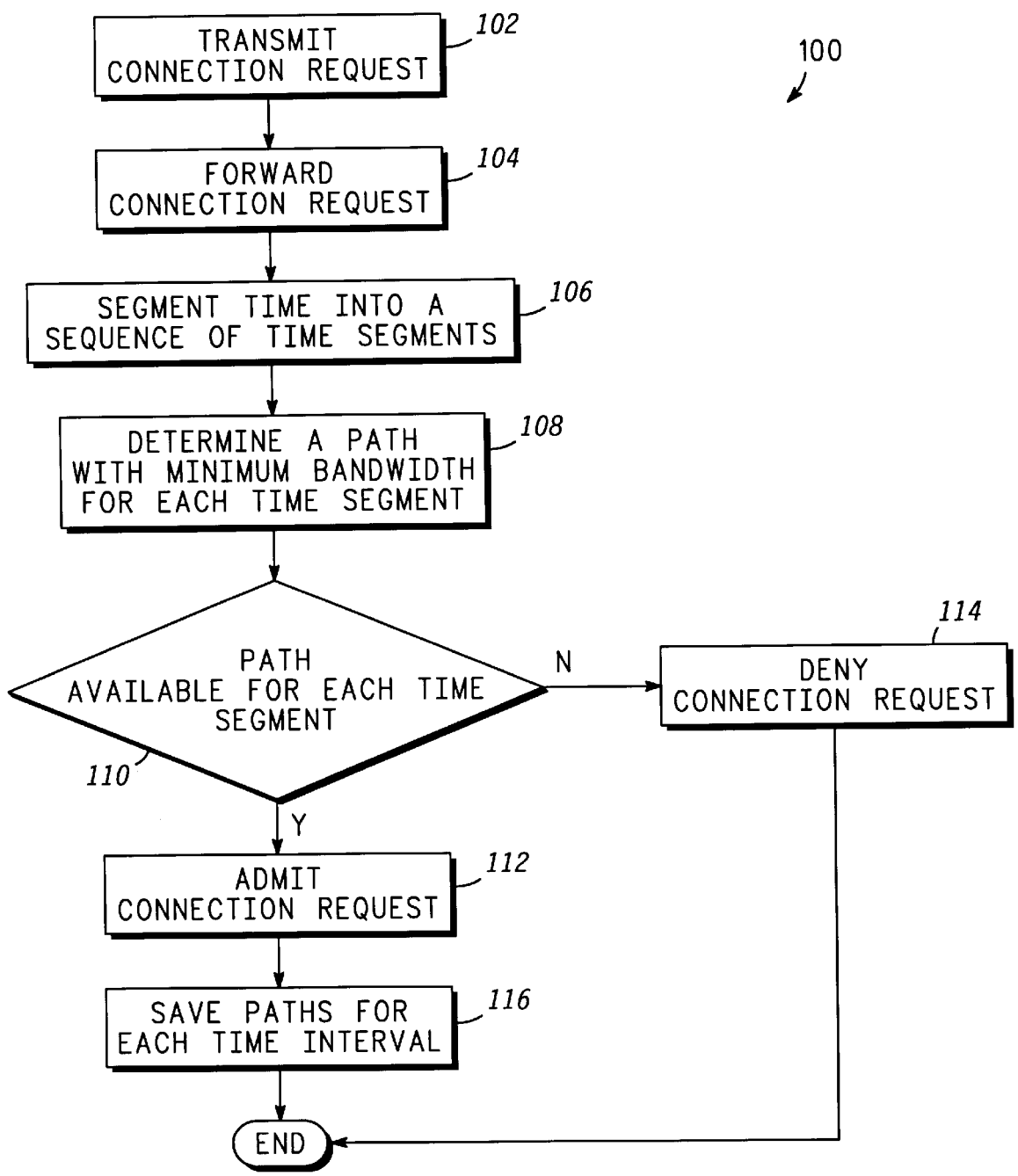

ADMISSION CONTROL SYSTEM AND METHOD IN SPACE-BASED MOBILE TELECOMMUNICATION SYSTEM

TECHNICAL FIELD

This invention relates generally to space-based mobile telecommunication systems and, in particular, to a system and method that admits connection requests in a space-based mobile telecommunication system.

BACKGROUND OF THE INVENTION

In terrestrial-based and geostationary networks, a communication path from an origin node to a destination node is specified by identifying a sequence of switches and interswitch trunks connecting them. A fundamental assumption in terrestrial-based and geostationary networks is that the network topology remains fixed for the entire duration of the connection (the connection holding time or the connection lifetime). A communication path between an origin and a destination node is determined and established prior to actual data communication. In fixed networks, the chosen path is used for the entire duration of the connection, provided the switches and links that constitute the path do not fail during the lifetime of the connection.

Call admission control is a process that is used to admit or deny requests for communication service utilizing the resources (switches and links) of the network. The call admission controller identifies a path with adequate resources, reserves the link bandwidths along the path, and then notifies the source and destination that information transmission can begin along the path.

A common characteristic of space-based mobile telecommunication systems (based on low-earth or medium-earth orbit satellites) is that the satellite constellation topology and link capacities vary with time (although in a predictable manner). State-of-the-art methods do not address the connection admission control problem in such networks with dynamic or mobile (i.e., time-dependent) network topology. The admission control process must ensure that if a new request is admitted into the system, it must not have any adverse effect on the quality of service of on-going connections or communication sessions.

Advanced mobile communication systems are expected to carry a wide variety of traffic types (voice, data, video and image). Effective traffic management is key to successful operation of such communication systems. Accordingly, there is a significant need for a system and method that manages traffic, namely, deciding whether to admit or deny requests for connection in a network that is constantly changing.

BRIEF DESCRIPTION OF THE DRAWINGS

FIG. 2 shows a flowchart of an admission control method for determining whether a new communication session between a source and destination node should be granted or denied according to a preferred embodiment of the present invention.

DESCRIPTION OF THE PREFERRED EMBODIMENTS

Figures 1, 3:
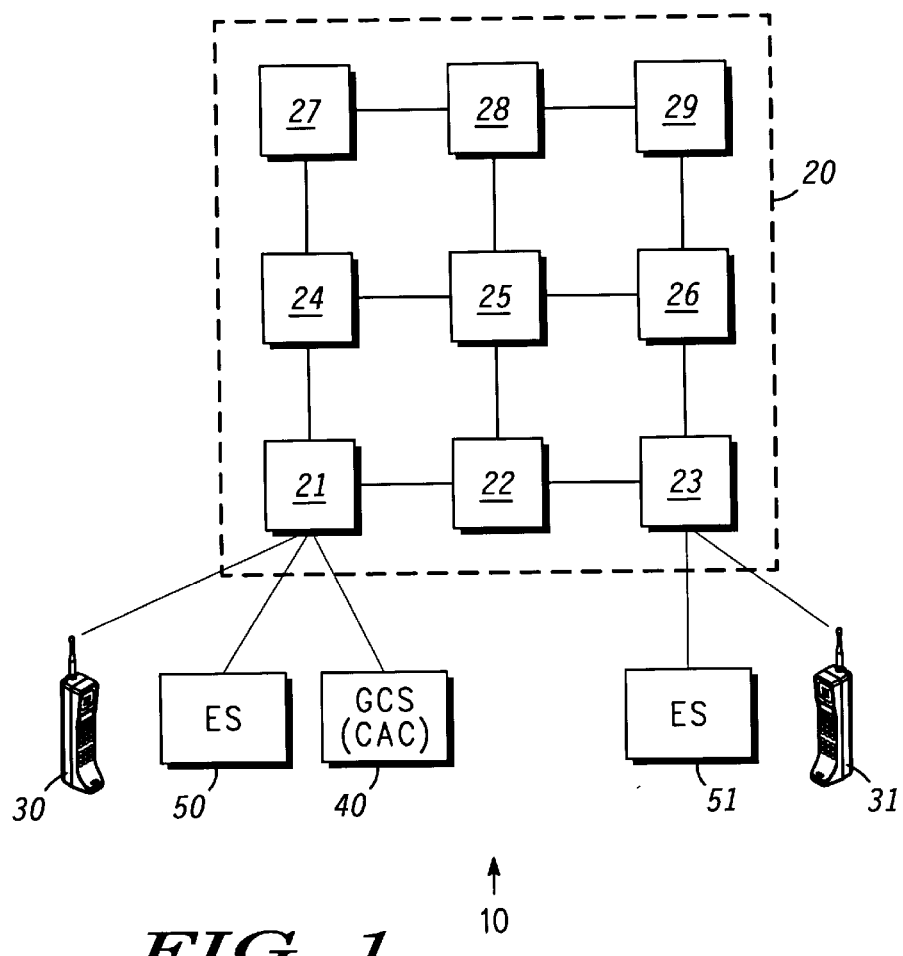
FIG. 1 shows a general view of a space-based mobile telecommunication system according to a preferred embodiment of the present invention.
FIG. 3 shows an example of a table that stores capacity and available capacity for a time segment according to a preferred embodiment of the present invention.

The present invention is related to a system and method that systematically determine whether adequate resources can be guaranteed for a new connection request without affecting on-going connections. In space-based mobile telecommunication networks, the communication path from the origin node to the destination node will not likely remain the same because of the dynamic nature of the network topology. In low-earth and medium-earth orbit satellite communication systems, handoff events may force the communication path from a source earth station to a destination earth station to change multiple times during the lifetime of a connection. New techniques for admission control are required to assure guaranteed availability of communication resources in networks with changing topology.

A "satellite" as used throughout this description means a man-made object or vehicle intended to orbit the earth. A "satellite" comprises low-earth and medium-earth orbiting satellites and/or combinations thereof. A "constellation" means a number of satellites arranged in orbits for providing specified coverage (e.g., radio communication, remote sensing, etc.) of a portion, portions or all of the earth. A constellation typically includes multiple rings (or planes) of satellites and may have an equal number of satellites in each plane, although this is not essential. The terms "cell", "beam" and "antenna pattern" are not intended to be limited to any particular mode of generation and include those created by either terrestrial or space-based telecommunication systems and/or combinations thereof.

FIG. 1 shows a general view of space-based telecommunication system 10 according to a preferred embodiment of the present invention. Although FIG. 1 illustrates a highly simplified diagram of space-based mobile telecommunication system 10, system 10 comprises a constellation of satellites 20, any number of subscriber units 30, 31 at least one ground control station 40 and at least one earth station 50. Generally, telecommunication system 10 may be viewed as a network of nodes, where satellites 21–29, subscriber units 30, 31 ground control station ("GCS") 40 and station ("ES") 50, 51 are considered nodes in network 10.

All nodes of communication system 10 are or may be in data communication with other nodes of communication system 10 through communication links. The communication link may comprise data and/or control information. In addition, all nodes of telecommunication system 10 are or may be in data communication with other telephonic devices, including subscriber units 30, dispersed throughout the world through PSTNs (public switched telephone networks) and/or conventional terrestrial communication devices coupled to a PSTN through conventional terrestrial base stations.

The present invention is applicable to space-based mobile telecommunication systems 10 that assign particular regions on the earth to specific cells on the earth, and preferably to systems that move cells across the surface of the earth. Although the present invention is applicable to space-based mobile telecommunication systems 10 having a constellation of satellites 20 in low-earth or medium-earth orbit, constellation 20 is preferably in low-earth orbit around earth.

The constellation of satellites 20 comprises at least one satellite. As shown in FIG. 1, an example of constellation 20 comprises satellites 21–29. Although nine satellites 21–29 are shown, the number of satellites may be greater or less than nine. The number of satellites is unimportant to the present invention. The present invention is also applicable to space-based telecommunication systems 10 having satellites 21–29 which orbit earth at any angle of inclination including polar, equatorial, inclined or other orbital patterns. The present invention is applicable to systems 10 where full coverage of the earth is not achieved (i.e., where there are "holes" in the telecommunication coverage provided by the constellation) and to systems 10 where plural coverage of portions of the earth occur (i.e., more than one satellite is in view of a particular point on the earth's surface).

Each satellite 21–29 communicates with other, nearby satellites 21–29 through cross-links. These cross-links form a backbone of space-based mobile telecommunication system 10. Thus, a call or communication from one subscriber unit 30 located at any point on or near the surface of the earth may be routed through a number of satellites to within range of substantially any other point on the surface of the earth. A communication may be routed down to a subscriber unit 30 (which is receiving the call) on or near the surface of the earth from another satellite 21–29. How satellites 21–29 physically communicate (e.g., spread spectrum technology) with subscriber units 30, ground control station 40 and earth stations 50, 51 is well known to those of ordinary skill in the art.

Although the present invention contemplates constellation 20 to comprise satellites 21–29, constellation 20 may comprise a combination of space-based satellites and earth-based gateways. In other words, the constellation does not have to be entirely in space, and may comprise bent-pipe satellites, relaying calls to earth-based gateways which in turn relay the calls to other space-based satellites and/or PSTNs.

Subscriber units 30 may be located anywhere on the surface of the earth or in the atmosphere above the earth. Mobile telecommunication system 10 may accommodate any number of subscriber units 30. Subscriber units 30 are preferably communication devices capable of receiving voice and/or data from satellites 21–29 and ground control station 40. By way of example, subscriber units 30 may be hand-held, mobile satellite cellular telephones adapted to transmit to and receive transmissions from satellites 21–29 and ground station 40.

How subscriber unit 30 physically transmits voice or data to and receives voice or data from satellites 21–29 is well known to those of ordinary skill in the art. In the preferred embodiment of the present invention, subscriber units 30 communicate with satellites 21–29 using a limited portion of the electromagnetic spectrum that is divided into numerous channels. The channels are preferably combinations of L-Band, K-Band and/or S-Band frequency channels but may encompass Frequency Division Multiple Access (FDMA) and/or Time Division Multiple Access (TDMA) and/or Code Division Multiple Access (CDMA) communication or any combination thereof. Other methods known to those of ordinary skill in the art may be used as well.

Ground control station 40 communicates with and controls satellites 21–29. As shown in FIG. 1, there may be multiple ground control stations 40 which are located at different regions on the earth. For example, there may be one ground control station located in Honolulu, another located in Los Angeles and another in Washington, D.C. An alternative embodiment is to have separate ground control stations located in each country on the earth.

Ground control station 40 performs connection admission control, determines routes for setting connections through the satellite constellation 20 and communicates the chosen routes to earth stations 50, 51. Ground control station 40 may additionally provide satellite control commands to satellites 21–29 so that satellites 21–29 maintain their proper position in their orbit and perform other essential housekeeping tasks. Ground control station 40 may also be responsible for receiving voice or data from satellites 21–29. How ground station 40 physically communicates (e.g., spread spectrum) with satellites 21–29 and subscriber units 30 is well known to those of ordinary skill in the art.

Ground control station 40 includes a Call Admission Controller ("CAC"). The call admission controller is responsible for executing connection admission control. The call admission controller comprises at least one processor and memory for executing a subset of the steps shown in the flowchart of FIG. 2 below.

Earth station 50 connects voice or data calls made on the earth over PSTNs to satellite constellation 20. As shown in FIG. 1, there may be multiple earth stations 50, 51 across the surface of the earth. Earth station 50 may be located anywhere on the earth. Although earth station 50 and ground control station 40 are shown separately, they may be contained in a single structure with multiple antennas. It is not important whether the ground control station and the earth station are separate or joined together under one facility. How earth station 50 physically communicates (e.g., spread spectrum) with satellites 21–29 and subscriber units 30 is well known to those of ordinary skill in the art.

The communication path from a source earth station (SES) to a destination earth station (DES) has three component subpaths over which a data packet (e.g., fax, voice, page, video, etc.) must be transported: an uplink (e.g., from the SES or a subscriber unit to a source satellite), a satellite constellation 20 (from the source satellite to a destination satellite in the satellite constellation) and a downlink (e.g., from the destination satellite down to the DES or a subscriber unit). An earth station is identified as a source earth station (SES) when it initiates a call or communication session with another earth station, called the DES. The SES is responsible for communicating data to a satellite in satellite constellation 20. A satellite in satellite constellation 20 communicates the data received from the SES to the DES which is located on the earth. The path between the SES and the DES may be bi-directional, meaning that data may be sent from the DES to the SES over the same subpaths.

FIG. 2 shows a flowchart of admission control method 100 for determining whether a new communication session between a source and destination node (e.g., earth stations and/or subscriber units) should be granted or denied according to a preferred embodiment of the present invention. Method 100 may be used to establish communication between earth stations 50 and 51, between subscriber unit 30 and earth station 50 or 51, or between subscriber units 30 and 31.

Suppose a source earth station wants to start a communication session with a destination earth station. More precisely, an application attached to the source earth station wants to start a communication session with an application attached to the destination earth station. In PIG. 1, suppose earth station 50 is the source earth station and earth station 51 is the destination earth station. Although a source earth station and destination earth station are used in this example, a source subscriber unit and destination subscriber unit may be used as well.

Method 100 begins in step 102 when a source earth station (or a subscriber unit) transmits a connection request to a satellite that is currently serving it. This satellite is identified as a "currently serving satellite" (or simply, a "source satellite"). As shown in the example of FIG. 1, if the source earth station is earth station 50, satellite 21 is then the currently serving satellite for source earth station 50 at the time of the connection request.

A destination satellite is a currently serving satellite for a destination earth station. For example, satellite 23 is the destination satellite and the currently serving satellite for destination earth station 51. It may be noted that the movement of satellites 21–29 in the constellation 20 causes the source satellite (and/or the destination satellite) to change with time as the source satellite moves out of range of the source earth station (or the destination satellite out of range of the destination earth station).

A connection request, in its generic form, comprises at least the following parameters: source address (of source earth station or subscriber unit), destination address (of destination earth station or subscriber unit), amount of bandwidth being requested, a minimum amount of bandwidth being requested and a maximum amount of bandwidth being requested. Optional parameters in the connection request include call holding time (how long the call will take), priority of the call (low, medium or high), a call type (premium or regular) and any other additional optional parameters. A premium call may be charged higher dollars per unit time of connection in comparison to a regular type call.

The connection request identifies the destination earth station and the amount of bandwidth to be provisioned between source earth station 50 and destination earth station 51. The amount of bandwidth requested specifies a minimum amount of bandwidth that has to be guaranteed for the connection between the source earth station and the destination earth station. In addition, a maximum bandwidth parameter specifies the maximum desired bandwidth for the connection. The space-based telecommunication system will provide bandwidth within the range determined by the above two parameters.

According to FIG. 2, currently serving satellite forwards in step 104 the connection request to a ground control station. During normal system operation, requests for connection originate from various source earth stations (or subscriber units) intended for various destination earth stations (or subscriber units). A ground control station handles admission control functions and call setup on behalf of the currently serving satellite. As shown in FIG. 1, ground control station 40 is the ground control station on behalf of currently serving satellite 21. Note, that as a satellite moves in its orbit, the ground control station can change (assuming multiple ground control stations are used in a system). Most importantly, currently serving satellite does not have to have a direct communication link to its ground control station. Control information from the currently serving satellite to its ground control station may pass through one or more satellites along a control path until it reaches a satellite that communicates directly with the ground control station. For example, suppose satellite 22 of FIG. 1 is the currently serving satellite of earth station 50 and ground control station 40 is the ground control station for currently serving satellite 22. Currently serving satellite 22 transmits the connection request to satellite 21 which then passes the connection request via its direct communication link to ground control station 40.

After the ground control station receives the connection request in step 104, call admission controller (CAC) in the ground control station determines whether sufficient resources are available for setting up the connection at an initial time segment by segmenting in step 106 the call holding time into a sequence of time segments: $T_0, T_1, T_2, T_3 \ldots T_{LAST}$. $T_{LAST}$ is equal to $T_0$ plus the call holding time. In each time segment, the network topology is static, meaning that the links are fixed or predetermined between satellites in the constellation and between the satellites and earth stations and ground control stations for the specified time segment. In other words, in each time segment, there is no need for an inter-satellite handoff of the connection from the currently serving satellite to another satellite.

The ground control station has up-to-date knowledge of the network state. At a given time instant, the ground control station stores network state information which comprises at least the information shown in FIG. 3. As shown in FIG. 3, "Node I" in column 60 and "Node J" in column 61 represents the two end nodes or points of a communication link. C(I,J,t) represents in column 62 the maximum capacity of the link from Node I to Node J at time segment t, and represents in column 64 the maximum capacity of the link from Node J to Node I at time segment t. A(I,J,t) represents in column 63 the available capacity of the link from Node I to Node J at time segment t, and represents in column 65 the available capacity of the link from Node J to Node I at time segment t. The available capacity of the link from Node I to Node J at time segment t does not have to be equal to the available capacity of the link from Node J to Node I at time segment t. The capacity in actual use on the link from Node I to Node J at time segment t may be found by subtracting the available capacity of the link A(I,J,t) from the maximum capacity of the link C(I,J,t). Capacity may represent the number of calls, bits per second (bps) or any other measurement meant to indicate what resources are available.

After the call holding time is segmented in a sequence of time segments in step 106, CAC determines for each time segment $(T_i, T_{(i+1)})$ in step 108 whether there is a path from the source node (earth station and/or subscriber unit) to the destination node (earth station and/or subscriber unit) with the required minimum bandwidth as provided in the connection request. As an example, suppose for a time segment, the network is linked together as shown in FIG. 1. Further suppose that a path needs to be identified for connecting a call between earth station 50 and earth station 51. The connection request of the call identifies the minimum bandwidth to be equal to 100, while the maximum bandwidth is equal to 300. According to the capacities recorded in the table shown in FIG. 3, the path ES 50→node 21→node 22→node 23→ES 51 is a path with adequate resources for the time segment. As shown in FIG. 3, the available capacity for the link from node (ES 50) to node 21 is 500 (see table entry 66 of FIG. 3), for the link from node 21 to node 22 is 300 (see table entry 67 of FIG. 3), for the link from node 22 to node 23 is 300 (see table entry 68 of FIG. 3) and for link from node 23 to node (ES 51) is 500 (see table entry 69 of FIG. 3). There are algorithms in the literature that are well known to those of ordinary skill in the art that describe graph theory and network optimization for identifying a path with adequate capacity between a source and destination node. Any of the well-known algorithms may be used in this step.

CAC in step 110 of method 100 determines whether there is a path available with the required capacity for each time segment. If there is a path having the required, available capacity for each time segment, then the CAC admits the connection request in step 112. Admitting the connection request means that the path or nodal sequences associated with each time segment are relayed to the source earth station. The source earth station loads the nodal sequence into the packets that are being sent along the network. Packets of data may be routed in each time segment as described in patent application by Kadathur Natarajan and entitled "System and Methods of Supporting Connection-Oriented Services in a Network with Changing Topology".

If there is no path available for one of the time segments, the connection request is denied in step 114 by the CAC. A denied request may be for example, a blocked call. If the denied call was to be admitted, it will degrade the quality of service of on-going connections in the network.

If a call is admitted in step 112 by the CAC, the CAC saves in step 116 the path chosen for each time segment and updates its network state information (or table comprising available capacities for each time segment). The ground control station will update the network state for each interval based on the path used in that interval. More generally, an ordered sequence of paths and the time interval in which each path should be used is identified and the corresponding network states are updated by the CAC at the ground control station. In particular, the links used and the residual capacity (i.e., link capacity minus traffic carried) of each link is saved by the CAC. For the example given above, the maximum bandwidth requested was 300. Thus, the residual capacity of A(50,21)=0 (or 300−300), of A(21,22)=0, of A(22,23)=0, of A(23,51)=200. The path has a reserved bandwidth of 300.

After step 116 or 114, method 100 ends. During the specified time segments, bandwidths are reserved along the links. These resources are released when the call terminates and the network state information is accordingly updated to reflect the new, available capacity or resources.

If the connection request does not include a parameter that specifies the call hold time, the ground control station may identify a path for an initial time segment I, reserve the necessary and available resources, update the network state information for time segment I and convey the results to the source earth station and destination earth station before time segment I begins. This process will be repeated at the ground control station as long as the connection is not terminated.

Other optional parameters such as priority of the call and the call type can be used to favor certain connection requests over others. Suppose there are several simultaneous requests pending at the CAC, and there are not enough adequate resources for admitting all of them. A higher priority call may be preferred to a lower priority call. Similarly, a premium call with greater willingness to pay more money may be favored over a regular call with nominal willingness to pay.

When a new connection request arrives some time after $T_0$, the CAC uses the new network state information (including the most recently admitted call or connection request) to make an admission control decision as outlined in the steps of method 100 of FIG. 2. During the time interval in which ES 50 is connected to ES 51 through nodes 21, 22 and 23, new calls can not use the link from node 21 to node 22 and from node 22 to node 23 because both of their available or residual capacities are zero.

There are many variations in which method 100 described above could be implemented in a satellite communication system. Method 100 provides a systematic way to decide when to admit connection requests in a low-earth or medium-earth orbit based satellite telecommunication system. More broadly, the method is applicable to systems in which network topology and capacities are dynamic and varying with time in a predictable manner.

It will be appreciated by those skilled in the art that the present invention provides guaranteed bandwidth connections in a mobile telecommunication networks that have varying topology and dynamic capacities. Accordingly, it is intended by the appended claims to cover all modifications of the invention which fall within the true spirit and scope of the invention. For example, a subscriber unit may make a connection request directly to a satellite. Instead of an earth station making a connection request to a currently serving satellite, a subscriber unit may make a connection request which bypasses the earth station. Moreover, a subscriber unit may be at the receiving end of a connection which bypasses the use of a destination earth station.

What is claimed is:

1. A call admission control method of admitting or denying a connection request in a network of nodes, comprising the steps of:

a) receiving the connection request, including a call holding time;

b) determining whether sufficient resources are available for setting up a connection to service the connection request in the network of nodes that is changing with time by segmenting the call holding time into a sequence of time segments and determining for each of the time segments whether there is a path through the network of nodes that has a required amount of bandwidth; and c) accepting the connection request if there are sufficient resources in the network of nodes.

2. A method as recited in claim 1, wherein step (a) comprises the step of receiving the connection request that includes a source address, a destination address and an amount of bandwidth being requested.

3. A method as recited in claim 1, wherein step (a) comprises the steps of:

a1) receiving the connection request at a currently serving satellite from a source earth station; and a2) the currently serving satellite forwarding the connection request to a call admission controller in a ground control station.

4. A method as recited in claim 3, wherein the connection request includes a call holding time, and wherein step (b) comprises the steps of:

the call admission controller segmenting the call holding time into a sequence of time segments; and the call admission controller determining for each of the time segments whether there is a path through the network of nodes that has a required amount of bandwidth.

5. A method as recited in claim 4, wherein step (b) further comprises the step of the call admission controller admitting the connection request if for each of the time segments there is the path through the network of nodes that has the required amount of bandwidth.

6. A method as recited in claim 4, wherein step (b) further comprises the step of the call admission controller denying the connection request if for at least one of the time segments there is no path through the network of nodes that has the required amount of bandwidth.

7. A method as recited in claim 6, wherein step (b) further comprises the step of the call admission controller storing the paths in the ground control station.

8. A call admission control method of admitting or denying a connection request in a network of nodes, the connection request including a required amount of bandwidth that is being requested, the call admission control method comprising the steps of:

a) receiving the connection request;

b) segmenting a call length of the connection request into a sequence of time segments;

c) determining for each of the time segments whether there is a path through the network of nodes that has the required amount of bandwidth;

d) admitting the connection request if for each of the time segments there is the path through the network of nodes that has the required amount of bandwidth; and e) denying the connection request if for at least one of the time segments there is no path through the network of nodes that has the required amount of bandwidth.

9. A call admission control method executed by a ground control station of admitting or denying a connection request in a network of nodes, the connection request including a required amount of bandwidth that is being requested, the call admission control method comprising the steps of:

a) the ground control station receiving the connection request;

b) the ground control station segmenting a length of the connection request into a sequence of time segments;

c) the ground control station determining for each of the time segments whether there is a path through the network of nodes that has the required amount of bandwidth;

d) the ground control station admitting the connection request if for each of the time segments there is the path through the network of nodes that has the required amount of bandwidth; and e) the ground control station denying the connection request if for at least one of the time segments there is no path through the network of nodes that has the required amount of bandwidth.

10. A call admission control method as recited in claim 9, further comprising the steps of:

a source earth station transmitting the connection request; and a currently serving satellite forwarding the connection request to the ground control station.

11. A call admission control method as recited in claim 9, further comprising the steps of:

a subscriber unit transmitting the connection request; and a currently serving satellite forwarding the connection request to the ground control station.

12. A call admission control method as recited in claim 9, wherein the network of nodes comprises satellites.

13. A system for call admission in a network of nodes, comprising:

a subscriber unit transmitting a connection request;

a currently serving satellite coupled to the subscriber unit and receiving the connection request and forwarding the connection request; and a ground control station coupled to the currently serving satellite and determining for each of a plurality of time segments whether there is a path through the network of nodes that has a required amount of bandwidth, admitting the connection request if for each of the time segments there is the path through the network of nodes that has the required amount of bandwidth and denying the connection request if for at least one of the time segments there is no path through the network of nodes that has the required amount of bandwidth.

\* \* \* \* \*